United States Patent [19]
Kadowaki

[11] Patent Number: 5,579,743
[45] Date of Patent: Dec. 3, 1996

[54] EXHAUST GAS RECIRCULATION VALVE CONTROL APPARATUS

[75] Inventor: Hisashi Kadowaki, Kariya, Japan

[73] Assignee: Nippondenso Co., Ltd., Kariya, Japan

[21] Appl. No.: 531,287

[22] Filed: Sep. 20, 1995

[30] Foreign Application Priority Data

Oct. 14, 1994 [JP] Japan ....................................... 6-248232

[51] Int. Cl.$^6$ ............................... F02M 25/07; H02P 8/00
[52] U.S. Cl. ........................ 123/571; 251/129.11; 318/696
[58] Field of Search ............................... 123/571, 339.26; 251/129.11, 129.12; 318/685, 696

[56] References Cited

U.S. PATENT DOCUMENTS

| | | | |
|---|---|---|---|
| 4,391,244 | 7/1983 | Kobashi et al. | 123/339.26 |
| 4,409,948 | 10/1983 | Hasegawa et al. | 123/571 |
| 4,690,119 | 9/1987 | Makino et al. | 123/571 |
| 4,690,120 | 9/1987 | Egle | 123/571 |
| 4,825,840 | 5/1989 | Hewette et al. | 123/571 |
| 4,848,652 | 7/1989 | Kennedy | 251/129.11 |
| 4,901,000 | 2/1990 | Center et al. | 318/696 |
| 5,203,312 | 4/1993 | Sato | 123/571 |
| 5,351,935 | 10/1994 | Miyoshi et al. | 251/129.11 |
| 5,503,131 | 4/1996 | Ohuchi | 123/571 |

FOREIGN PATENT DOCUMENTS

| | | |
|---|---|---|
| 60-81442 | 5/1985 | Japan . |
| 61-106962 | 5/1986 | Japan . |
| 4-301170 | 10/1992 | Japan . |

*Primary Examiner*—Willis R. Wolfe
*Attorney, Agent, or Firm*—Cushman, Darby & Cushman IP Group of Pillsbury Madison & Sutro LLP

[57] ABSTRACT

An internal combustion engine exhaust gas recirculation valve control apparatus which, during exhaust gas recirculation (EGR) control, can correct positional error due to stepping out of a stepping motor actuating an exhaust gas recirculation valve and effect EGR control with increased accuracy. A controller initializes the stepping motor during EGR control when the target opening degree of the exhaust gas recirculation valve becomes 'fully closed' by driving the stepping motor to cause a valve body to abut a valve seat.

9 Claims, 14 Drawing Sheets

FIG.7

| PRESENT MODE | 0 | 1 | 2 | 3 | 4 | 5 | 6 | 7 | 8 | 9 | 10 |
|---|---|---|---|---|---|---|---|---|---|---|---|
| CONTENT | OPEN 2-PHASE | CLOSE 2-PHASE | STOP | START 1-PHASE (1) | REVERSE 1-PHASE (2) | IMPACT STOP 1-PHASE | STOP 1-PHASE (2) | IMPACT STOP 1-PHASE | IMPACT STOP 1-PHASE (1) | REVERSE STOP 1-PHASE | REVERSE START 1-PHASE (2) |
| TEGRSTP (STOP) | 9 | 9 | 2 | 2 | 2 | 5 | 2 | 8 | 7 | 8 | 2 |
| TEGROPN (OPEN) | 0 | 4 | 3 | 0 | 3 | 5 | 3 | 4 | 3 | 3 | 0 |
| TEGRCLX (IMPACT) | 8 | 5 | 5 | 10 | 5 | 5 | 5 | 1 | 5 | 8 | 1 |
| TEGRCLS (CLOSE) | 8 | 1 | 3 | 10 | 3 | 5 | 3 | 1 | 4 | 8 | 1 |
| TABLE NAME | | | | | | | | | | | |

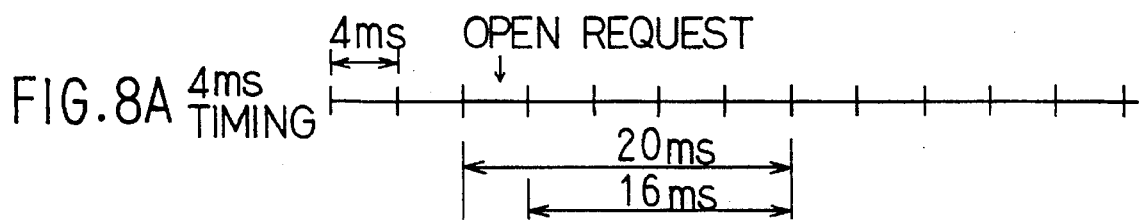
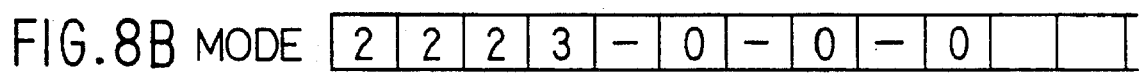
FIG.8A 4ms TIMING — 4ms, OPEN REQUEST, 20ms, 16ms
FIG.8B MODE | 2 | 2 | 2 | 3 | - | 0 | - | 0 | - | 0 |
FIG.8C ϕn
FIG.8D ϕn-1 — UNSTABLE DUE TO CHOPPING
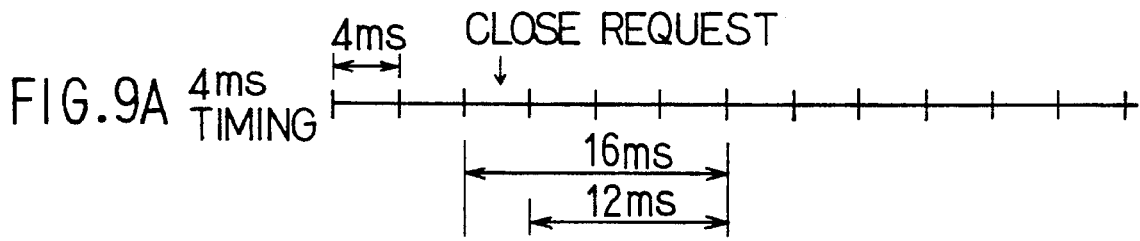
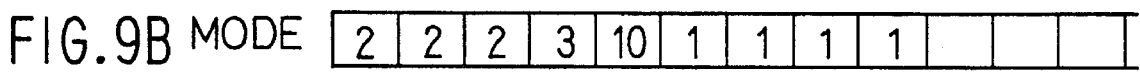
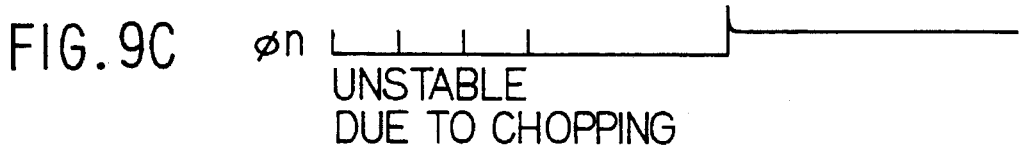
FIG.9A 4ms TIMING — 4ms, CLOSE REQUEST, 16ms, 12ms
FIG.9B MODE | 2 | 2 | 2 | 3 | 10 | 1 | 1 | 1 | 1 |
FIG.9C ϕn — UNSTABLE DUE TO CHOPPING
FIG.9D ϕn-1

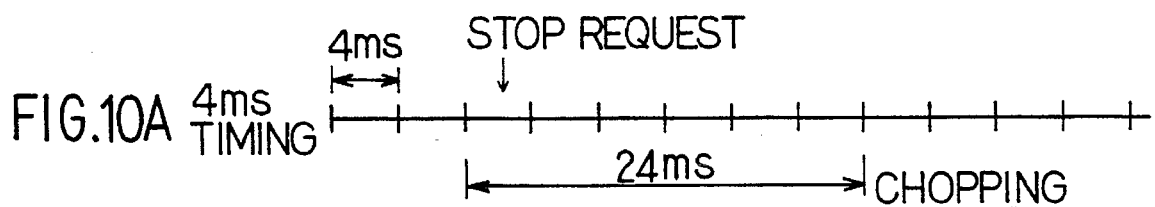
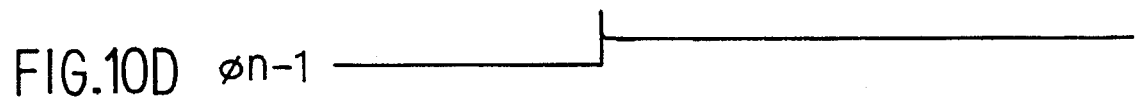
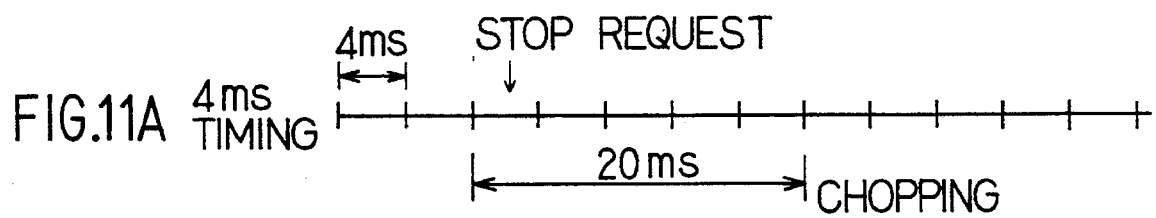
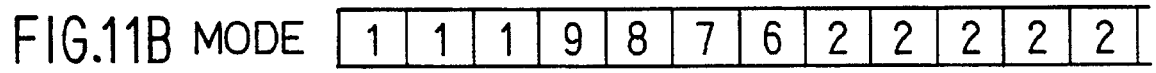
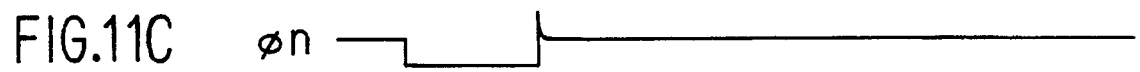

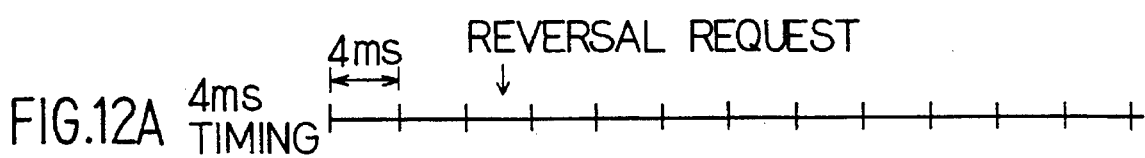
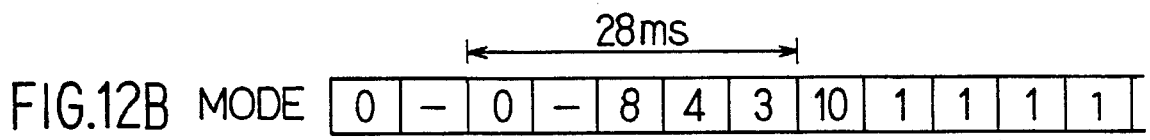
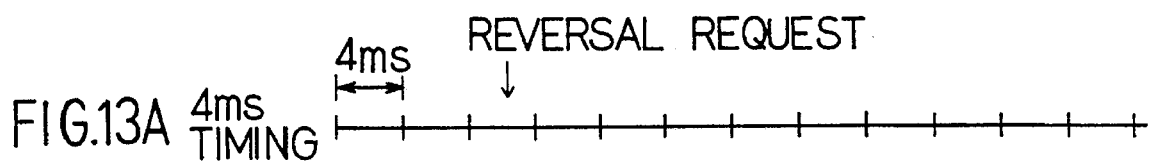
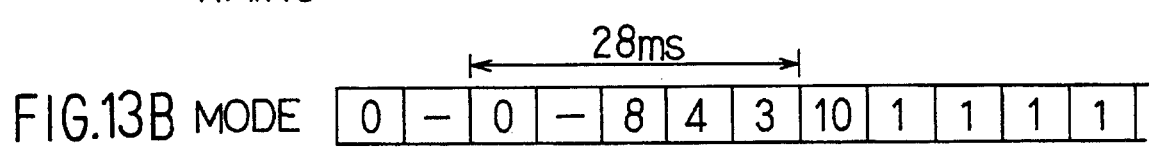
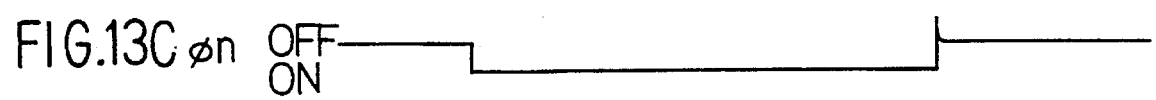

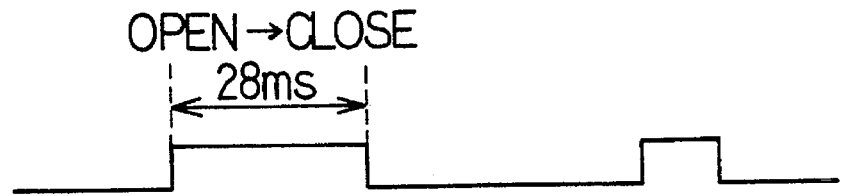
FIG.14A
FIG.14B
FIG.14C
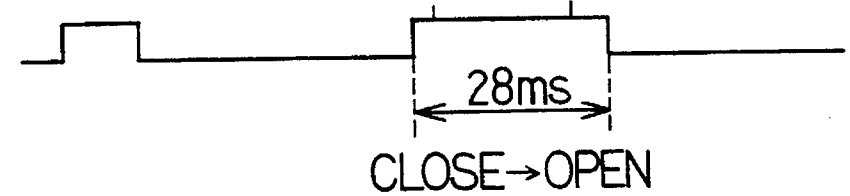
FIG.14D
FIG.15
| MODE | | DELAY TIME |
|---|---|---|
| STOP | OPEN →STOP | 24ms |
| | CLOSE→STOP | 20ms |
| REVERSAL | OPEN →CLOSE | 28ms |
| | CLOSE →OPEN | 28ms |
| START | STOP →OPEN | 18~20ms |
| | STOP →CLOSE | 12~18ms |

EXHAUST GAS RECIRCULATION VALVE CONTROL APPARATUS

CROSS REFERENCE TO RELATED APPLICATION

This application is based on and claims priority of Japanese Patent Application No. 6-248232 filed on Oct. 14, 1994, the content of which is incorporated herein by reference.

BACKGROUND OF THE INVENTION

1. Field of the Invention

This invention relates to a stepping motor initialization control apparatus and, particularly, to an exhaust gas recirculation valve control apparatus wherein an exhaust gas recirculation valve disposed in an exhaust gas recirculation passage is driven by a stepping motor.

2. Description of Related Art

In exhaust gas recirculation apparatuses (so-called EGR apparatuses) such as shown in Japanese Patent Publication No. H.2-38783 (U.S. Pat. No. 4,391,244), there have been those which, by using a stepping motor as means for driving an exhaust gas recirculation valve (EGR valve) for controlling the amount of exhaust gas recirculated, are able to finely control the opening degree of the exhaust gas recirculation valve.

With these apparatuses, to make the rotational position of the stepping motor and the opening degree of the exhaust gas recirculation valve correspond correctly, before controlling the exhaust gas recirculation valve it is necessary to initialize the stepping motor and certainly set the rotational position of the stepping motor to the fully closed position (reference position) of the exhaust gas recirculation valve. For this reason, conventional exhaust gas recirculation apparatuses initialize the stepping motor immediately after the ignition switch is turned OFF; to perform this initialization a main relay control circuit is provided to keep a main power supply relay in an ON state for a predetermined period after the ignition switch is turned OFF so that current can be supplied to the stepping motor for a predetermined period after the ignition switch is turned OFF, and the stepping motor is initialized during this period.

However, with such conventional apparatuses as described above, because initialization (return to the fully closed position) of the stepping motor is carried out after turning the ignition switch OFF, if the stepping motor once steps out during exhaust gas recirculation control (hereinafter called 'EGR control'), there is no occasion for the positional error due to the stepping out to be corrected (i.e. there is no occasion for initialization to be carried out) until the ignition switch is turned OFF, EGR control is continued with the stepping motor stepped out and there is a likelihood of this causing reduction in the engine output and deterioration of the drivability of the vehicle.

SUMMARY OF THE INVENTION

This invention has a primary object to improve stepping motor initialization control.

This invention has a further object to provide an exhaust gas recirculation valve control apparatus which during EGR control can correct positional error due to stepping out of a stepping motor and perform EGR control with high accuracy.

In order to achieve the above-described object and other objects, a control apparatus according to the invention drives by a stepping motor a valve disposed in a fluid passage for fluid flow control, such as an exhaust gas recirculation valve disposed in an exhaust gas recirculation passage for recirculating some of the exhaust gas from an exhaust part of an internal combustion engine to an intake part of the same, and comprises initialization controlling means for initializing the stepping motor during valve operation, such as EGR operation control, when a target opening degree of the valve becomes 'fully closed' by closing the valve until a valve body thereof abuts on a valve seat.

Preferably, the initialization controlling means initializes the stepping motor and closes the exhaust gas recirculation valve every time the target opening degree of the exhaust gas recirculation valve becomes 'fully closed'.

Also, when closing the exhaust gas recirculation valve and initializing the stepping motor the initialization controlling means preferably drives the stepping motor through a greater number of steps than the actual number of steps from the present position to the fully closed position of the exhaust gas recirculation valve.

The initialization controlling means may also be made so that even if the target opening degree of the exhaust gas recirculation valve changes during initialization the initialization controlling means gives priority to and completes the initialization.

BRIEF DESCRIPTION OF THE DRAWINGS

In the accompanying drawings:

FIG. 7 is a two-dimensional table used to obtain a new mode from a present mode and a table name;

FIGS. 8A through 8D are time charts showing modes and drive signals when an exhaust gas recirculation valve is shifted from a stopped state to an opening state;

FIGS. 9A through 9D are time charts showing modes and drive signals when an exhaust gas recirculation valve is shifted from a stopped state to a closing state;

FIGS. 10A through 10D are time charts showing modes and drive signals when an exhaust gas recirculation valve is shifted from an opening state to a stopped state;

FIGS. 11A through 11D are time charts showing modes and drive signals when an exhaust gas recirculation valve is shifted from a closing state to a stopped state;

FIGS. 12A through 12D are time charts showing modes and drive signals when an exhaust gas recirculation valve is shifted from an opening state to a closing state;

FIGS. 13A through 13D are time charts showing modes and drive signals when an exhaust gas recirculation valve is shifted from a closing state to an opening state;

FIGS. 14A through 14D are stepping motor drive pulse waveforms when a valve body movement direction is reversed;

FIG. 15 is a table showing relationships between modes and delay times;

DETAILED DESCRIPTION OF THE PREFERRED EMBODIMENTS

Figure 1:
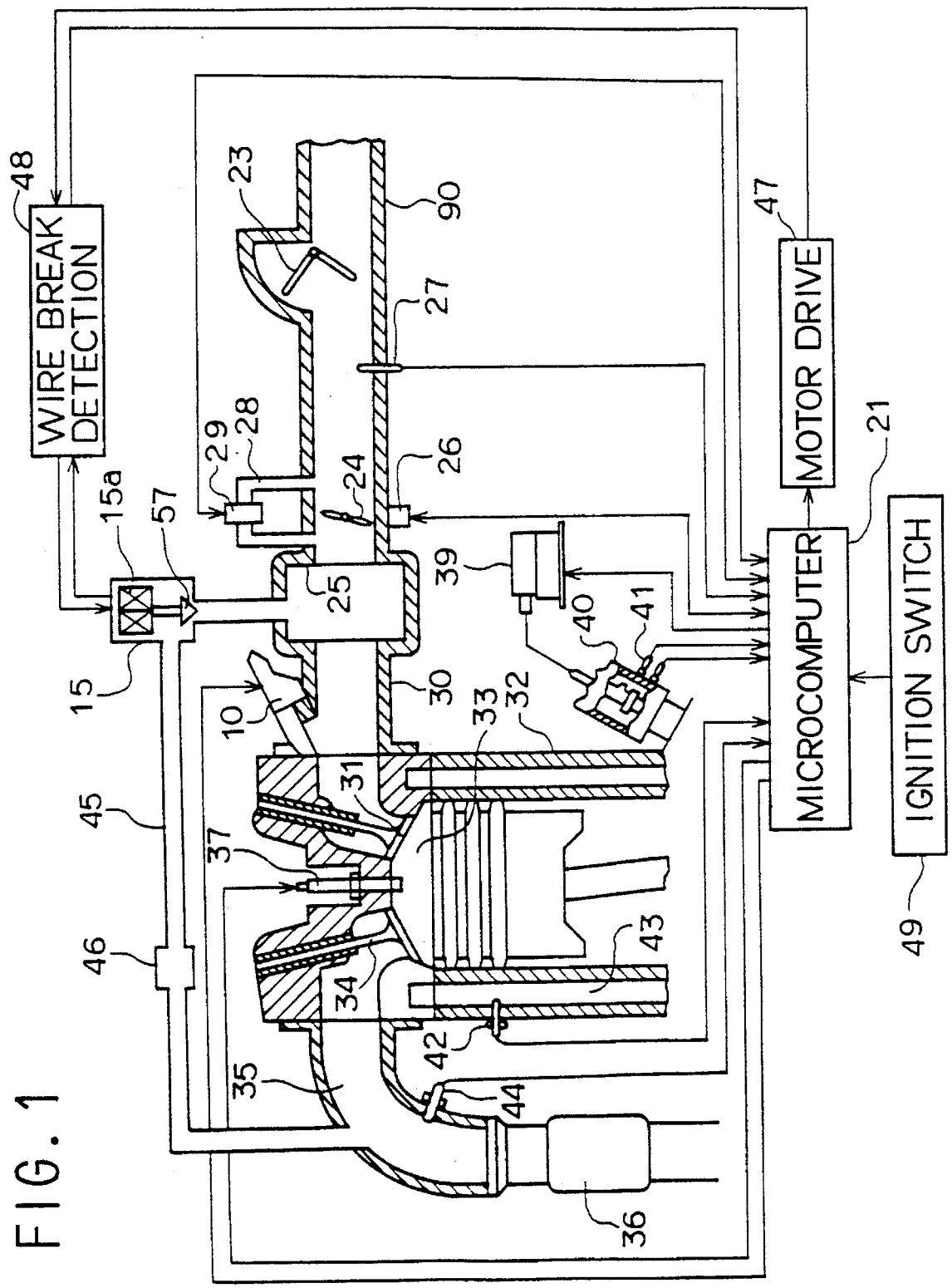
FIG. 1 is a schematic overall construction view of an exhaust gas recirculation valve control apparatus according to a preferred embodiment of the invention.

A preferred embodiment of the invention applied to a 4-cylinder, 4-stroke engine will now be described with reference to the accompanying drawings. First, based on FIG. 1, the overall construction of an engine control system and an exhaust gas recirculation control system will be described.

An airflow meter 23, a throttle valve 24 and a surge tank 25 are disposed in an intake pipe 90. An intake air temperature sensor 27 which measures the intake air temperature is disposed near the airflow meter 23, and an idle switch 26 which is ON when the throttle valve 24 is fully closed is associated with the throttle valve 24.

A bypass passage 28 which bypasses the throttle valve 24 is provided between the upstream and downstream sides of the throttle valve 24, and an idle speed control valve (hereinafter referred to as 'ISCV') 29 of which the valve opening degree is controlled by a solenoid (not shown in the figure) is disposed in this bypass passage 28. The duty ratio of the electrical current flowing to this ISCV 29 is controlled to control the opening degree of the valve and thereby control the amount of air flowing through the bypass passage 28, and the idling speed of an engine 32 is thereby controlled and kept to a target speed. The surge tank 25 is connected to an intake manifold 30 and through intake valves 31 to a combustion chambers 33 of the engine 32. A fuel injector 10 projects into the intake manifold 30 for each cylinder, and fuel is injected from these fuel injectors 10 into air flowing through the intake manifold 30. The combustion chambers 33 are connected to a catalytic convertor 36 by way of exhaust valves 34 and an exhaust manifold 35.

An igniter 39 generates a high voltage, and this high voltage is distributed from a distributor 40 to spark plugs 37 of the cylinders. A rotational angle sensor 41 detects the rotation of the shaft of the distributor 40 and produces an engine speed signal to a microcomputer 21 for example at every 30° CA. A water temperature sensor 42 for detecting the engine cooling water temperature is disposed partly projecting through the engine block into a water jacket 43.

An $O_2$ sensor 44 is disposed partly projecting into the exhaust manifold 35 and detects the oxygen concentration in the exhaust gas before it enters the catalytic convertor 36. The exhaust manifold 35 on the upstream side of this $O_2$ sensor 44 is connected to the surge tank 25 on the downstream side of the throttle valve 24 by an exhaust gas recirculation passage 45, and an EGR cooler 46 and an exhaust gas recirculation valve (hereinafter called 'the EGRV') 15 are disposed in this exhaust gas recirculation passage 45. The EGR cooler 46 lowers the temperature of the exhaust gas flowing through the exhaust gas recirculation passage 45. The valve opening degree of the EGRV 15 changes according to a drive signal applied through a motor drive circuit 47 and a wire breakage detection circuit 48 from the microcomputer 21.

Next, the construction of the EGRV 15 will be described based on FIG. 2. The EGRV 15 comprises a 4-phase, 64 pole stepping motor 15a, a valve body 57, an outer compression spring 51 and an inner compression spring 52. The stepping motor 15a comprises exciting coils 53, a rotor 54, a screw 55 and a motor shaft 56. A shaft 58 is attached to the end of the motor shaft 56 by way of plates 63a and 63b, the valve body 57 is fixed to the end of this shaft 58, and the valve opening degree is adjusted by adjustment of the position of this valve body 57 with respect to a valve seat 59. The opening of the valve seat 59 connects an input port 60 which exhaust gas flows into and an output port 61 which exhaust gas flows out of. The outer compression spring 51 has one end fixed to the plate 63b and the other end fixed to a housing 62 and urges the motor shaft 56 and the shaft 58 toward the valve seat 59 (i.e. in the valve-closing direction). The inner compression spring 52 is disposed between the plates 63a and 63b and normally is restrained by a stopper of the plate 63a as shown in FIG. 2.

Next, the operation of this EGRV 15 will be described. When the rotor 54 rotates as a result of a drive signal being applied to the stepping motor 15a, this rotational motion is converted into linear motion and transmitted to the motor shaft 56 by the screw 55. At this time, when the rotational direction of the stepping motor 15a is the forward direction, the motor shaft 56 moves in the upward direction of FIG. 2 against the spring force of the outer compression spring 51 and by way of the shaft 58 the valve body 57 is moved away from the valve seat 59 (in the valve-opening direction). As a result, the input port 60 is connected to the output port 61 through the opening of the valve seat 59.

Figure 2:
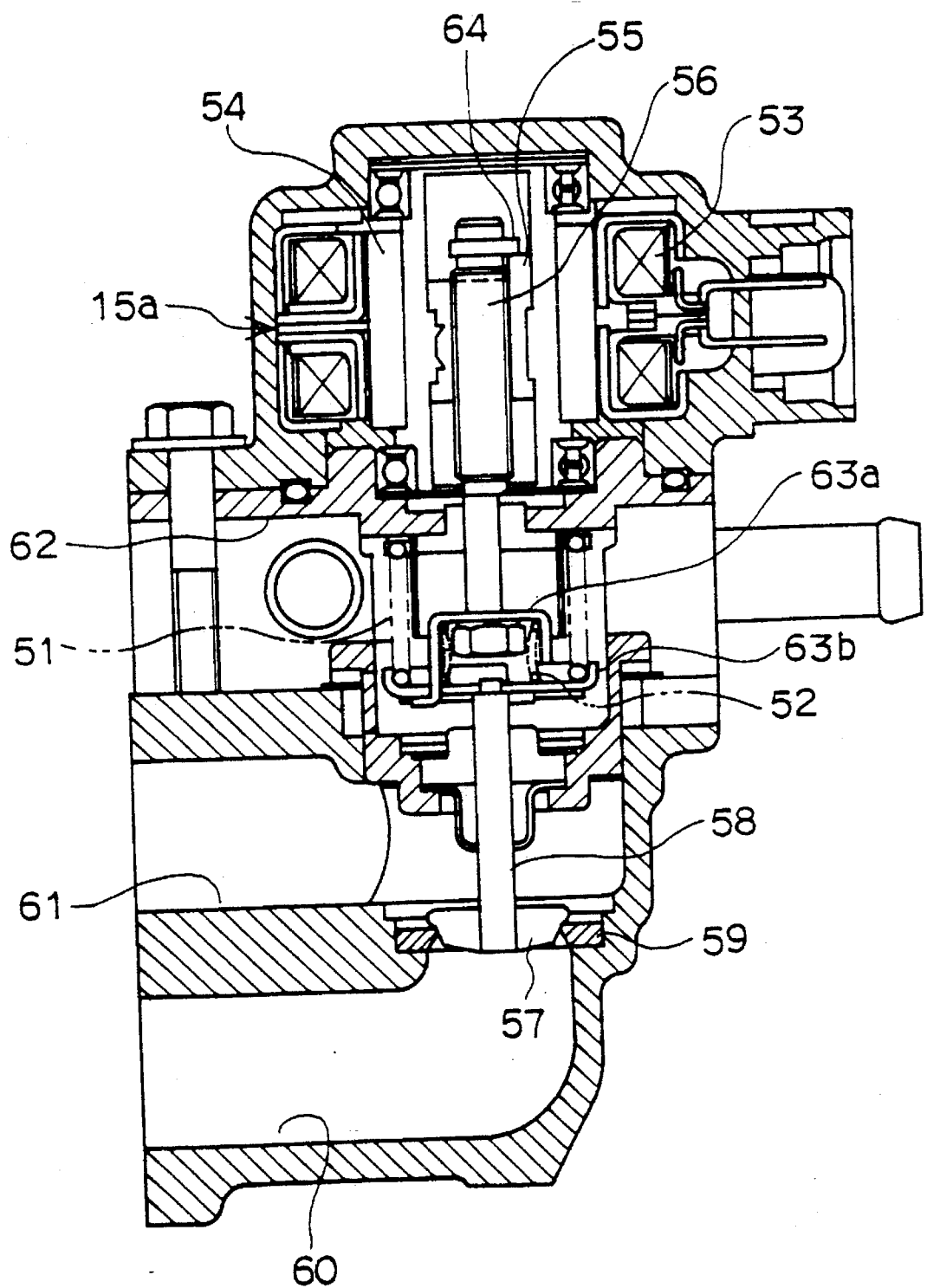
FIG. 2 is a sectional view of an exhaust gas recirculation valve (EGRV)

When on the other hand the rotational direction of the stepping motor 15a is the reverse direction, the motor shaft 56 moves in the downward direction of FIG. 2, the direction in which it is urged by the spring force of the outer compression spring 51, by way of the shaft 58 the valve body 57 is moved toward the valve seat 59 (in the valve-closing direction), and the valve body 57 fits snugly onto the valve seat 59 as shown in the figure. When after this the stepping motor 15a rotates further in the reverse direction, the motor shaft 56 moves further downward against the spring force of the inner compression spring 52, and this causes the shaft 58 and the valve body 57 to be over-stroked in the downward direction of FIG. 2 within the stroke of the inner compression spring 52. As a result, the valve body 57 is more strongly pushed against the valve seat 59, and leakage of exhaust gas from the input port 60 into the output port 61 is prevented.

By the opening degree of the EGRV 15 being controlled in this way, the amount of flow of exhaust gas taken in through the EGR cooler 46 is controlled and the amount of exhaust gas recirculated to the intake manifold 30 is thereby controlled.

The motor drive circuit 47 of FIG. 1 is a circuit which generates multiple phase drive signals sequentially fed to the 4-phases of exciting coils 53 of the stepping motor 15a, and these drive signals are applied to the exciting coils 53 by way of the wire breakage detection circuit 48. The wire breakage detection circuit 48 is a circuit which detects wire breakage of the exciting coils 53 of the stepping motor 15a and produces a detection signal to the microcomputer 21. An ignition switch (IG) ON/OFF signal is also applied to this microcomputer 21.

Figure 3:
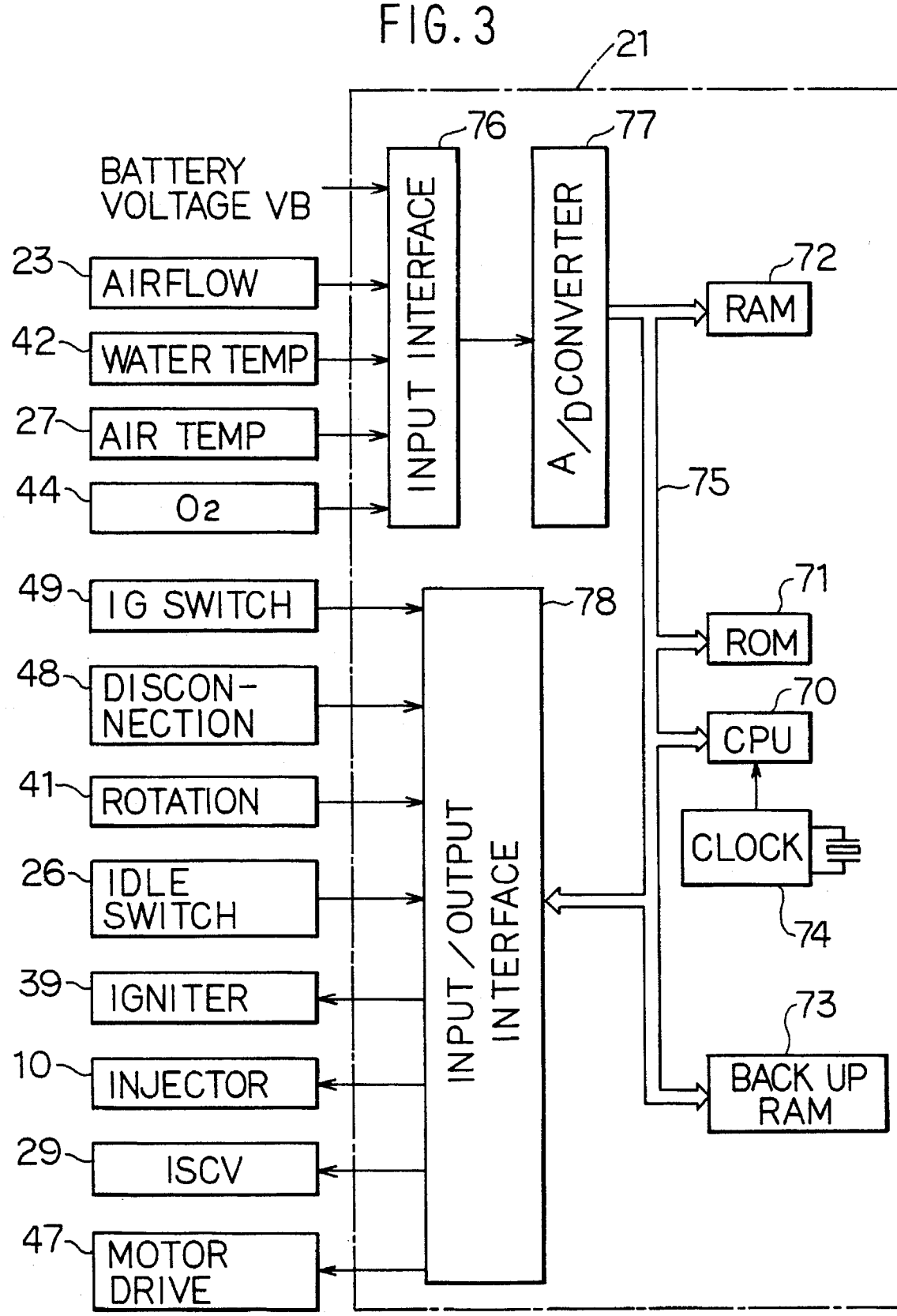
FIG. 3 is a block diagram of a control system.

The microcomputer 21, which controls the operation of the various parts shown in FIG. 1, has the kind of hardware construction shown in FIG. 3. Parts in FIG. 3 which also appear in FIG. 1 have been given the same reference numerals as in FIG. 1. Referring to FIG. 3, the microcomputer 21 has a central processing unit (CPU) 70, a read only memory (ROM) 71 for storing processing programs and maps which will be further discussed later, a random access memory (RAM) 72 used as a temporary data storage, a backup RAM 73 for holding data after the engine has stopped and a clock generator 74 for supplying a master clock to the CPU 70, and these are connected to each other by way of a two-way bus line 75. An input interface circuit 76, an A/D convertor with multiplexer 77 and an input/output interface circuit 78 are also connected to the bus line 75. The output of the input interface circuit 76 is applied into the A/D convertor 77.

Detection signals from the airflow meter 23, the intake air temperature sensor 27, and the water temperature sensor 42 and the $O_2$ sensor 44, and a battery voltage VB are severally applied into the A/D convertor 77 through the input interface circuit 76, and after being converted into digital data here are sequentially fed onto the bus line 75.

A detection signal from the idle switch 26, an engine speed detection signal from the rotational angle sensor 41 and the detection signal from the wire breakage detection circuit 48 on the other hand are severally fed onto the bus line 75 through the input/output interface circuit 78. Also, prescribed control signals are fed from the CPU 70 through the bus line 75 and the input/output interface circuit 78 severally to the igniter 39, the fuel injectors 10, the ISCV 29 and the motor drive circuit 47.

Figure 4:
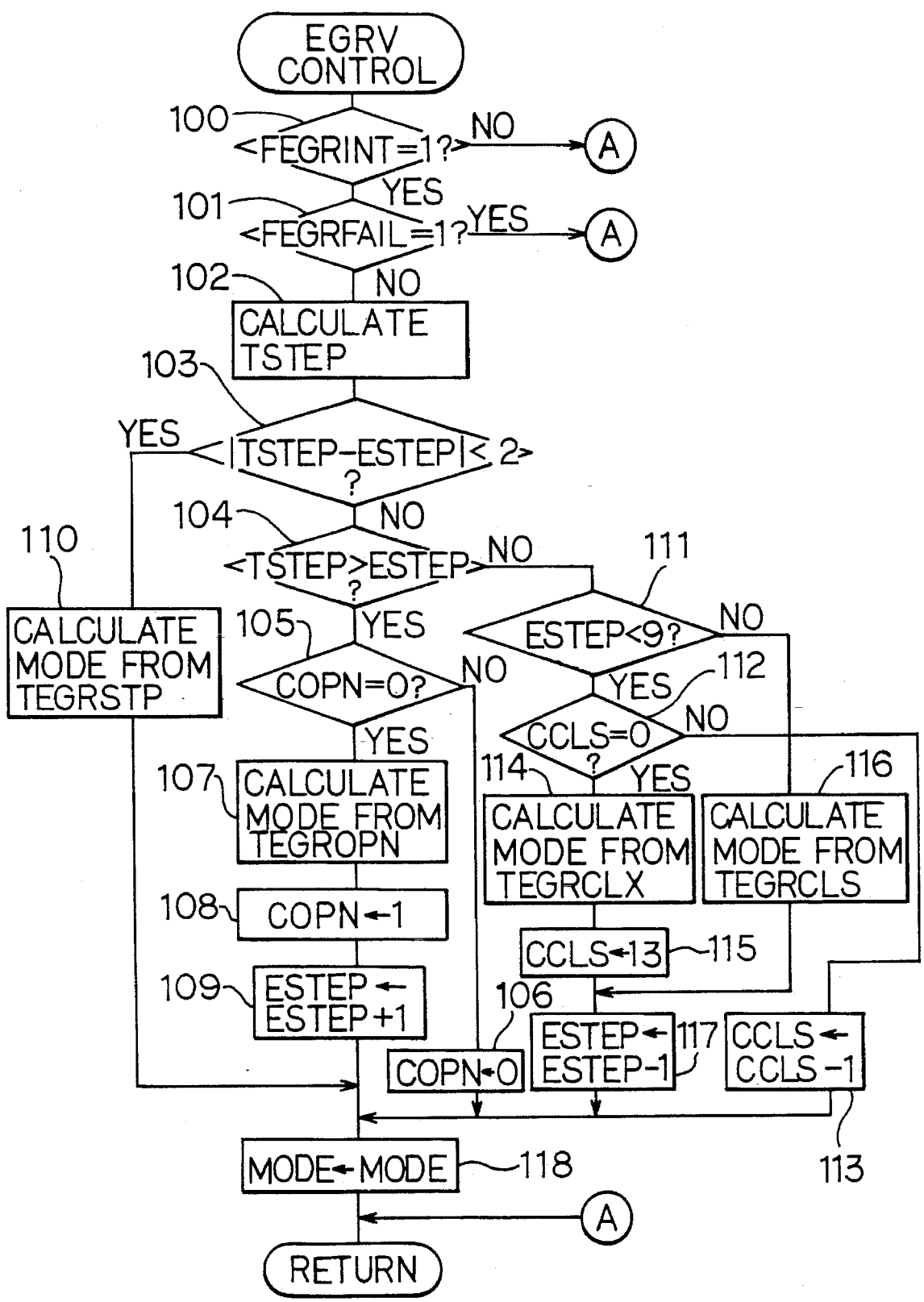
FIG. 4 is a processing flow chart of an EGRV control routine.

Next, the operation of the exhaust gas recirculation valve control apparatus shown in FIG. 1 for controlling the EGRV 15 will be described. In accordance with a program stored in the ROM 71 in the microcomputer 21, the EGRV control routine shown in FIG. 4 is started for example every 4 ms. In this routine, first, in step 100, it is determined whether or not a flag FEGRINT showing whether or not initialization of the stepping motor 15a has been completed is "1", and when it is "0", i.e. when initialization has not been completed, the routine is ended without the subsequent processing therein being executed.

When on the other hand FEGRINT is "1" in other words when initialization has been completed, processing proceeds to step 101 and determines whether or not a flag FEGRFAIL showing whether or not a wire breakage detection signal from the wire breakage detection circuit 48 has been applied and whether or not misoperation of the EGRV 15 has been detected from the air intake flow detected by the airflow meter 23 is "1", and when it is "1" determines the EGRV 15 to be abnormal and ends the routine. When on the other hand FEGRFAIL is not "1", (when it is "0"), processing determines the EGRV 15 to be normal and calculates a target step number TSTEP (step 102).

Figure 5:
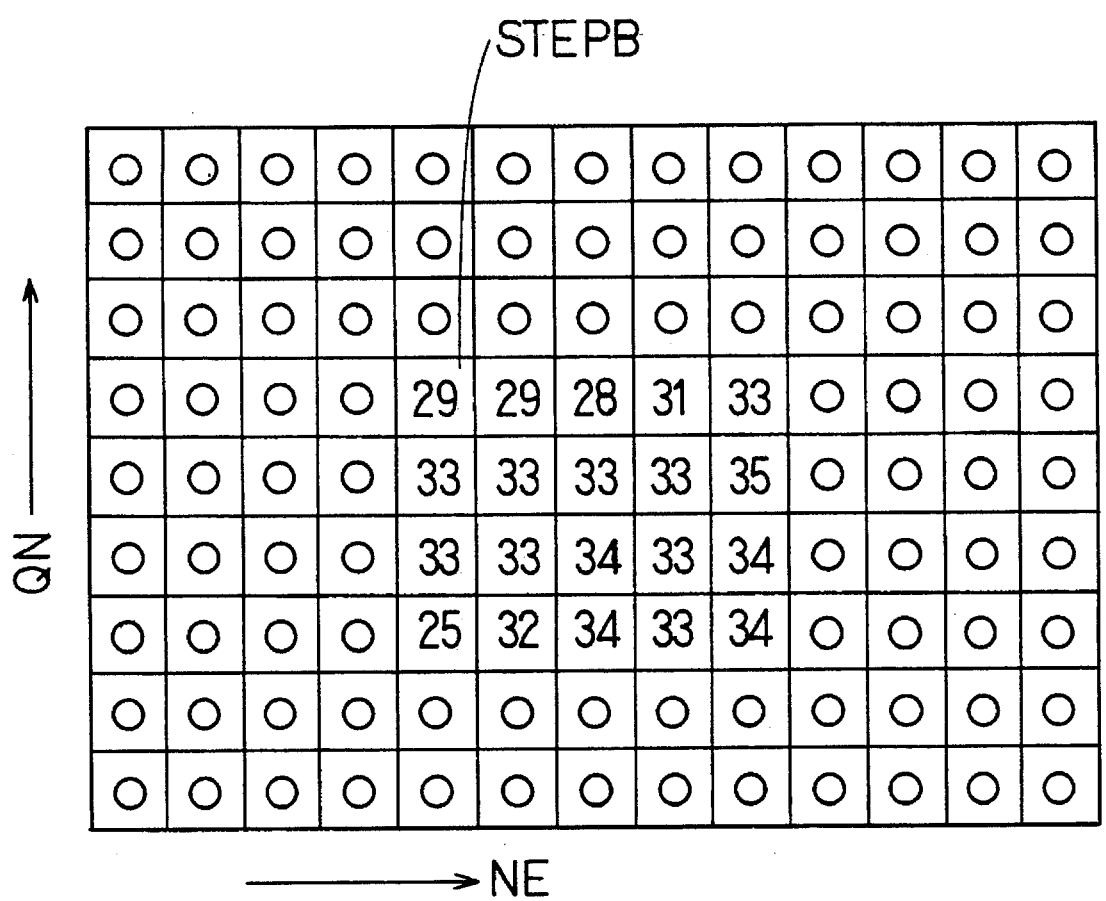
FIG. 5 is a table used to calculate target step numbers.
Figure 6:
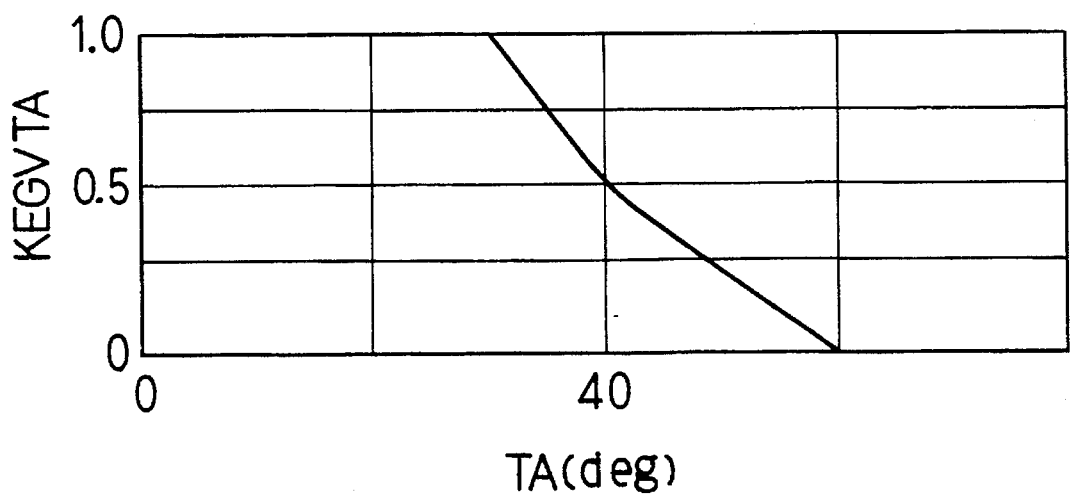
FIG. 6 is a graph illustrating the relationship between throttle opening degree TA and a throttle opening degree correction factor KEGVTA.

This calculation of the target step number TSTEP is carried out by calculating a map step number STEPB with reference to a two-dimensional table shown in FIG. 5 pre-stored in the ROM 71 of engine speed NE and intake airflow QN and multiplying this by a throttle opening degree correction factor KEGVTA which as shown in FIG. 6 is substantially inversely proportional to the throttle opening degree TA. In the calculation of the map step number STEPB, values between the cells of the table of FIG. 5 are calculated by interpolation. This target step number TSTEP for example has a minimum value of '0' and shows fully open at a maximum value of '60' and 'fully closed' at '5' to '0'.

After the calculation of the above-mentioned target step number TSTEP, processing determines whether or not the absolute value of the difference between the target step number TSTEP and the present step number ESTEP known by the CPU 70 as the opening degree of the EGRV 15 is less than "2" (step 103). This is to prevent 'hunting' by providing a dead band of 2 steps.

Here, when an absolute value |TSTEP−ESTEP|≧2, the sizes of the target-step number TSTEP and the present step number ESTEP are compared (step 104). At such times as after engine starting, because the EGRV 15 is normally fully closed, TSTEP>ESTEP; in this case, processing proceeds to step 105 and determines whether or not a counter COPN is "0"; when it is not "0", it is set to "0" (step 106), and when it is "0" processing refers to a mode table shown in FIG. 7 stored in the ROM 71 and calculates a new mode from the present mode and the table name 'TEGROPN' (step 107) in the table.

For example, immediately after engine starting, because the EGRV 15 is fully closed, as can be seen from FIG. 7 the present mode (MODE) is "2"; in this case, the new mode calculated in step 107 is the mode "3" at the intersection of the present mode "2" and the table name 'TEGROPN'. In the mode table of FIG. 7, the 'n-phase' entries in the contents row are excitement methods.

After the new mode is calculated in the above-mentioned step 107, the counter COPN is set to "1" (step 108) and the value of the present step number ESTEP is incremented by "1" toward the target step number TSTEP (step 109). After the processing of this step 109 or the above-mentioned step 106, the value MODE of the new mode is stored in place of the present mode MODE (step 118), and the routine is ended.

Thereafter, the mode is renewed each time this routine is executed, and in the above example is renewed from 2 to 3 to 0. The modes from this fully closed time to a fully open time and changes in the currents φn, φn−1 flowing through the exciting coils 53 of any two adjacent phases among the four phases of exciting coils 53 are shown in FIGS. 8A through 8D. In the waveforms of FIGS. 8A through 8D, the high levels of φn, φn−1 indicate periods of no current flow and the low levels show periods of current flow.

When as a result of steps 101 to 109 and step 118 being repeated each time the routine in FIG. 4 is executed the present step number ESTEP approaches the target step number TSTEP and the difference between the two becomes "1" or "0", processing proceeds to step 110, calculates a new mode from the present mode "0" and the table name 'TEGRSTP' in the table of FIG. 7, leaves the value of ESTEP at its present value and stores the new mode MODE (step 118), and ends the routine.

When in step 104 it is determined that TSTEP≦ESTEP, processing determines whether the present step number ESTEP is less than "9" (step 111), when it is less than "9" determines whether a counter CCLS is "0" (step 112), and when the counter CCLS is "1" or greater decrements the counter CCLS by "1" (step 113). When the counter CCLS is "0", processing refers to the mode table shown in FIG. 7 and calculates a new mode value MODE from the present mode and the table name 'TEGRCLX' in the table (step 114), and sets the value of the counter CCLS to "13" (step 115). When on the other hand it is determined in step 111 that the present step number ESTEP is "9" or greater, processing calculates a new mode value MODE from the present mode and the table name 'TEGRCLS' in the table (step 116).

When after the processing of step 115 or when in step 116 a new mode MODE is calculated, the present step number ESTEP is decremented by "1" to make it approach the target step number TSTEP (step 117), the new mode value MODE is stored in place of the present mode value MODE (step 118), and the routine is ended.

After the processing of step 113, processing proceeds to step 118 without decrementing the present step number ESTEP. As a result, when the stepping motor 15a is started from the stopped state to move in the direction in which it closes the EGRV 15, as shown schematically in FIGS. 9A through 9D, the mode changes from $2 \rightarrow 2 \rightarrow 2 \rightarrow 3 \rightarrow 10 \rightarrow 1 \rightarrow 1 \ldots$, and when the EGRV 15 is brought from the opening state to the stopped state, as shown schematically in FIGS. 10A through 10D, the mode changes from $0 \rightarrow 9 \rightarrow 8 \rightarrow 7 \rightarrow 6 \rightarrow 2 \rightarrow \ldots$, and when the EGRV 15 is brought from the closing state to the stopped state, as shown schematically in FIGS. 11A through 11D, the mode changes from $1 \rightarrow 9 \rightarrow 8 \rightarrow 7 \rightarrow 6 \rightarrow 2 \rightarrow \ldots$.

The modes and motor drive signals of when the EGRV 15 reverses from the opening state to the closing state are shown in FIGS. 12A through 12D, and the modes and motor drive signals of when the EGRV 15 reverses from the closing state to the opening state are shown in FIGS. 13A through 13D.

Because as a result of using the mode table shown in FIG. 7 in this way it is possible to provide a delay period when the stepping motor 15a drive is stopped, reversed or started, as shown in FIG. 15, stable operation of the stepping motor 15a is possible.

By thus controlling the present step number ESTEP so that it adopts the value of the target step number TSTEP which changes according to the running state of the engine, the microcomputer 21 can control the opening degree of the EGRV 15 in accordance with the running state of the engine.

When during movement in the valve-closing direction the present step number ESTEP is less than "9", because based on the counter CCLS the present step number ESTEP decreases by "1" every 14 starts of the 4 ms routine of FIG. 4 as shown in steps 111 to 117 in FIG. 4, the movement speed of the valve body 57 of the EGRV 15 is set to 1 step of valve-closing every 56 ms (=4 ms×14), 1/14 of the speed when the present step number ESTEP is "9" or greater.

The reason for the movement speed of the valve body 57 being set to this relatively low speed is that when the valve body 57 impacts with the valve seat 59, if the valve body 57 is moving quickly there is a possibility of the stepping motor 15a stepping out. Another reason is that the valve body 57 itself is carrying out flow control, and if the valve body 57 is damaged by an impact it cannot carry out flow control accurately. When the motor drive circuit 47 reverses the direction of movement of the valve body 57, as shown in FIGS. 12A through 12D, FIGS. 13A through 13D and FIGS. 14A through 14D, a drive pulse is generated so that current flows through exciting coils 53 of the same phase for longer than normal. This is to effect reversal of the direction of movement with certainty and prevent stepping out of the stepping motor 15a. FIGS. 14A through 14D show drive pulses of each phase applied to the base of a transistor (not shown in the figures) for switching the exciting coils 53 of the different phases.

Because no position sensor is provided on the stepping motor 15a or the EGRV 15, during EGR control, the position of the stepping motor 15a (the opening degree of the EGRV 15) is determined by calculating how far the present step number ESTEP is from a reference position and the amount of exhaust gas recirculated is controlled by so controlling the stepping motor 15a that the present step number ESTEP (the actual opening degree) coincides with the target step number TSTEP (the target opening degree). Therefore, to carry out this EGR control accurately, it is necessary that the rotational position of the stepping motor 15a and the opening degree of the EGRV 15 be made to correspond correctly, and to accomplish this it is necessary to initialize the stepping motor 15a and certainly set the rotational position of the stepping motor 15a to the reference position of the EGRV 15 at suitable intervals.

It is preferable that this initialization be carried out with the fully closed state of the EGRV 15 as the reference position; this is because when the fully open state of the EGRV 15 is made the reference position, because the EGRV 15 becomes fully open during initialization, there is a likelihood of this having adverse affects not only on exhaust emissions but also on engine output and drivability.

Accordingly, in this preferred embodiment, the stepping motor 15a is initialized with the fully closed state of the EGRV 15 as the reference position. The specific initialization method is described below.

Figure 16:
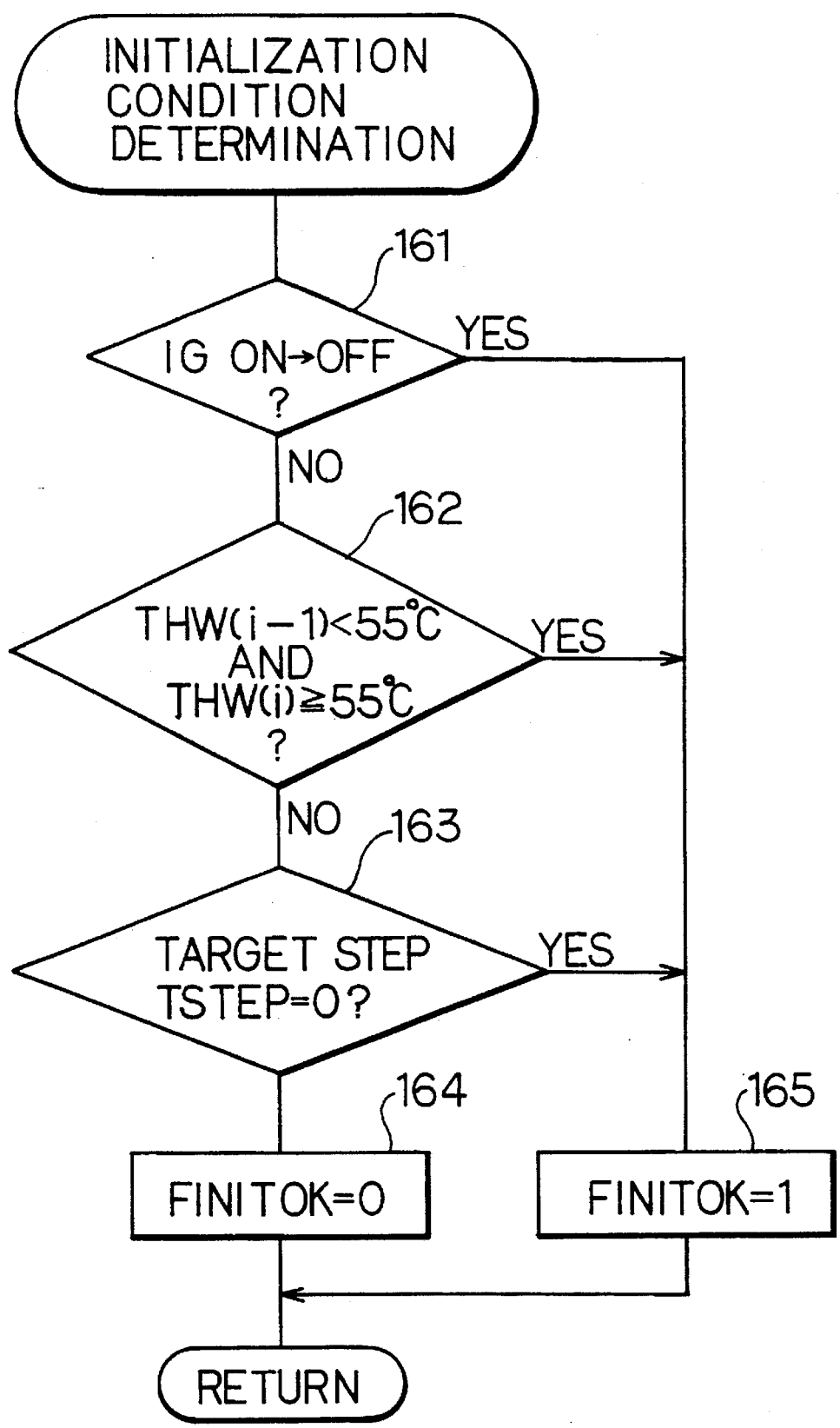
FIG. 16 is a processing flow chart of an initialization conditions establishment determination routine.

An initialization execution conditions establishment determination routine shown in FIG. 16 is a routine for determining whether the conditions for initialization execution are established. In this preferred embodiment, initialization of the stepping motor 15a (return to the fully closed position) is carried out at the following times [1] to [3]:

[1] immediately after the ignition switch (IG) 49 is turned from ON to OFF

[2] in the period immediately before the commencement of EGR control [for example when EGR control is started when the cooling water temperature reaches 60° C. the time at which the cooling water temperature THW reaches a predetermined temperature (for example 55° C.)]

[3] every time the target step number TSTEP (target opening degree) becomes 0 ('fully closed').

For example, immediately after the IG 49 is switched to OFF, the initialization execution conditions are established and the determination of step 161 in FIG. 16 is 'Yes'; processing proceeds to step 165, an initialization execution conditions establishment flag FINITOK is set to "1" and the routine is ended. Also in the period immediately before the start of EGR control, in other words when the last cooling water temperature THW(i-1) was below a predetermined temperature (for example 55° C.) and the cooling water temperature THW(i) this time is above the predetermined temperature, the initialization execution conditions are established, the determination of step 162 is 'Yes', processing proceeds to step 165, the initialization execution conditions establishment flag FINITOK is set to "1" and the routine is ended. And also each time the target step number TSTEP becomes 0 ('fully closed'), processing proceeds to step 165, the initialization execution conditions establishment flag FINITOK is set to "1" and the routine is ended.

When on the other hand none of the initialization execution conditions [1] to [3] are satisfied, the determinations of steps 161 to 163 are all 'No', processing proceeds to step 164, the initialization execution conditions establishment flag FINITOK is set to "0" and initialization is not carried out.

Figure 17:
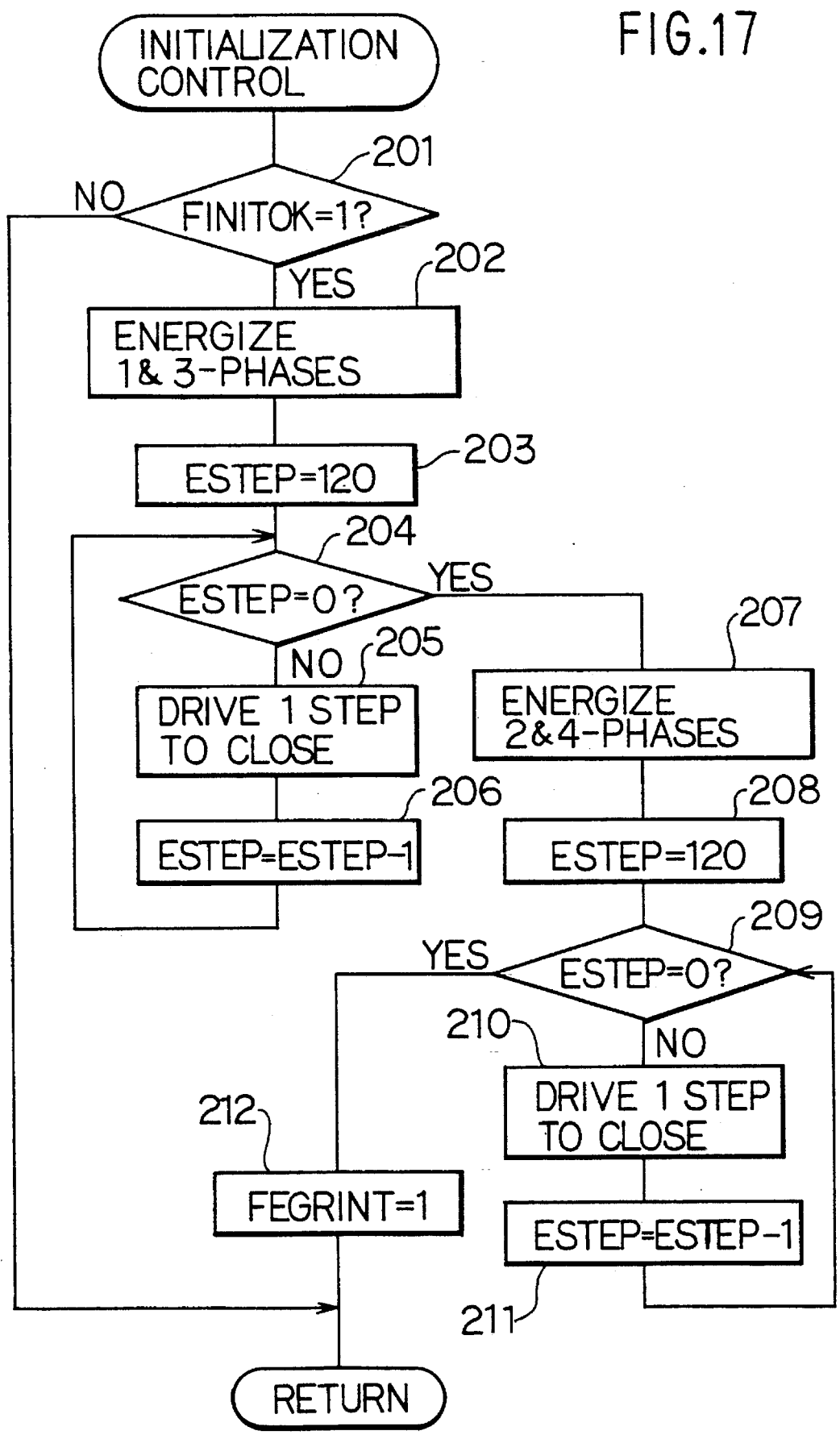
FIG. 17 is a processing flow chart of an initialization control routine.

An initialization control routine shown in FIG. 17 functions as "initialization controlling means".

In this initialization control routine, first, in step 201, processing determines whether or not the above-mentioned initialization conditions establishment flag FINITOK is "1", and when it is not "1", i.e. when none of the initialization execution conditions [1] to [3] are satisfied, the routine is ended without the subsequent initialization processing therein being carried out.

If the initialization conditions establishment flag FINITOK is "1", the stepping motor 15*a* is initialized (steps 202 to 212). In this preferred embodiment, closing of the EGRV 15 is carried out by passing current through two opposing phases of the stepping motor 15*a* only, instead of driving all four phases. Here, first, closing is carried out with the stepping motor 15*a* driven as a 2-phase stepping motor having current passing through the opposing phases 1 and 3 (step 202), i.e., energizing 1 and 3-phases. Then, the present step number ESTEP stored in the RAM 72 is changed to twice the maximum step number (that as of when the EGRV 15 is fully open; in this preferred embodiment, for example 60×2=120) and restored in the RAM 72 (step 203).

After that, in steps 204 to 206, by a process of decrementing the present step number ESTEP by "1" each time the stepping motor 15*a* is driven through 1 step in the closing direction by 2-phase drive of its first and third phases being repeated, the EGRV 15 is closed by 2-phase drive of the first and third phases of the stepping motor 15*a* until the present step number ESTEP becomes "0" (in this preferred embodiment, after 120 steps). In this process, each time the stepping motor 15*a* is driven through 1 step, interruption processing of a drive speed control routine shown in FIG. 18 is carried out and as will be further discussed later the drive speed of the stepping motor 15*a* (the current flow time per 1 step) is determined according to the battery voltage VB.

After closing of the EGRV 15 is carried out in this way with the stepping motor 15*a* being driven as a 2-phase stepping motor by current being passed through the first and third phases, the phases through which current is passed are changed and closing is carried out similarly again with the stepping motor 15*a* being driven as a 2-phase stepping motor by current being passed this time through the second and fourth phases (steps 207 to 211). When closing with the first and third phases and with the second and fourth phases as described above is finished, processing proceeds to step 212, a flag FEGRINT showing that initialization of the stepping motor 15*a* has finished is set to "1" and processing returns to the EGRV control routine described above shown in FIG. 4.

The drive principle of the stepping motor 15*a* will now be explained, with reference to FIGS. 18A through 18D. In FIGS. 18A through 18D, to simplify the explanation, the case of a 4-phase, 4-pole stepping motor is described; however, in this preferred embodiment, the stepping motor 15*a* is of a 4-phase multi-pole (specifically, 4-phase, 64-pole) construction, like for example the stepping motor disclosed in Japanese Laid-Open Patent Publication No. S.60-81442, to provide better holding magnetic force of the rotor and make possible higher driving speeds.

Figure 18A:
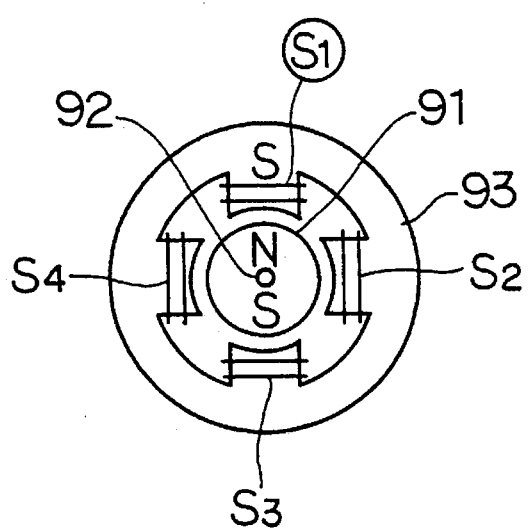
FIGS. 18A through 18D are schematic views illustrating a stepping motor drive principle.
Figure 18C:
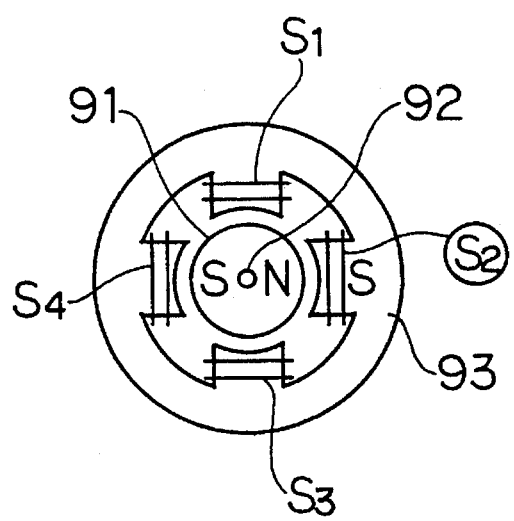

As shown in FIG. 18A, when a current is passed through the exciting coil S1 only, because an S pole is formed on the inner side of the exciting coil S1, the N pole of the magnet rotor 91 is attracted thereto. Next, as shown in FIG. 18C, when a current is passed through the exciting coil S2 only, because an S pole is formed on the inner side of the exciting coil S2, the N pole of the magnet rotor 91 is attracted thereto and the magnet rotor 91 is turned clockwise through 90°.

Figure 18B:
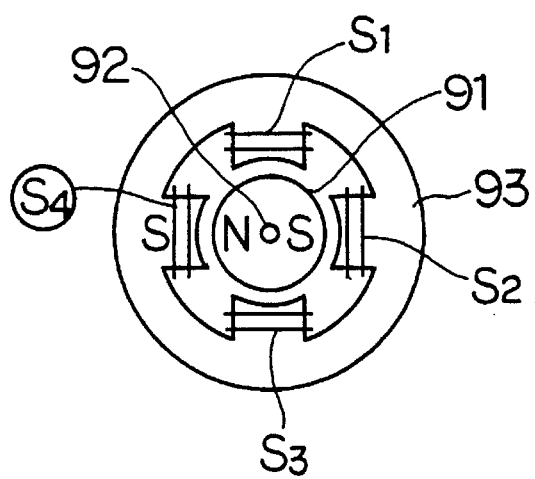
Figure 18D:
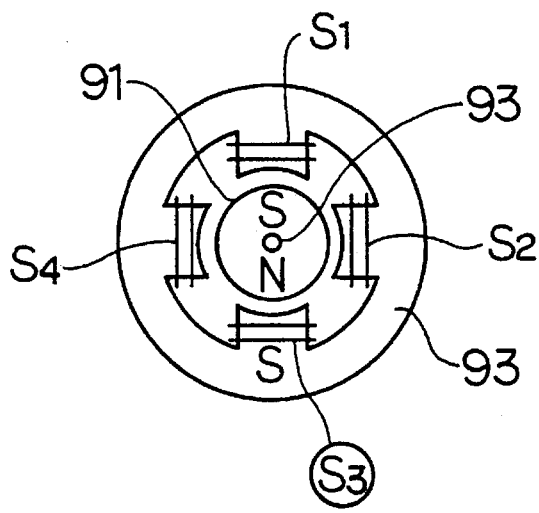

Similarly thereafter, by current being passed through the exciting coils sequentially in the order S3, S4, S1 . . . , as shown in FIGS. 18D, 18B and 18A, . . . respectively, the clockwise rotation of the magnet rotor 91 about the shaft 92 is continued. By reversing the order in which current is passed through the exciting coils S1 to S4, the magnet rotor 91 is rotated counterclockwise about the shaft 92. If clockwise rotation of the magnet rotor 91 closes the valve body 57, counterclockwise rotation of the magnet rotor 91 moves the valve body 57 in the valve-opening direction. Normally two phases of the stepping motor 15*a* are excited at the same time, but the rotation is still fundamentally based on the principle illustrated in FIGS. 18A through 18D.

In this preferred embodiment, first a two-phase motor is constructed using the first and third phases of the stepping motor 15*a*; in this case, the normal states are only those shown in FIGS. 18A and 18D. During drive in the valve-closing direction the magnet rotor 91 should rotate in the clockwise direction as described above, but for example when the current flow changes from the first phase to the third phase, whether the magnet rotor 91 rotates in the valve-closing direction (clockwise) or the valve-opening direction (counterclockwise) cannot be univocally decided because the conditions are the same, and the magnet rotor 91 may rotate in either direction. This is a problem of when the stepping motor 15*a* is used with 2-phase drive, and the rotational direction during 2-phase drive is determined by other outside forces and inertial forces.

However, in the stepping motor 15*a* of this preferred embodiment, because the motor shaft 56 is urged in the valve-closing direction by the spring force of the outer compression spring 51 as shown in FIG. 2, it is possible to drive the stepping motor 15*a* by 2-phase drive in the valve-closing direction until the valve body 57 is fully closed, and the above-mentioned problem is eliminated.

Since the stepping motor 15*a* adjusting the opening degree of the EGRV 15 is controlled with an open loop, when stepping out occurs for some reason during EGR control, the control accuracy deteriorates greatly. However, if it is possible to carry out initialization occasionally even during EGR control, positional error of the stepping motor 15*a* can be corrected during EGR control.

Accordingly, in this preferred embodiment, as described above, each time the target step number TSTEP (the target opening degree) becomes 0 ('fully closed') during EGR control, the stepping motor 15*a* is initialized and the valve body 57 of the EGRV 15 is closed until it abuts with the valve seat 59. As a result, each time the target step number TSTEP becomes 'fully closed' during EGR control, positional error of the stepping motor 15*a* due to stepping out or the like can be corrected.

In this case, because the stepping motor 15*a* is initialized every time the target step number TSTEP becomes 'fully closed', positional error of the stepping motor 15*a* is corrected more frequently and the precision of the EGR control is higher. However, in this invention, it is not necessary to carry out initialization processing every time the target step number TSTEP becomes 'fully closed' during EGR control, and it may alternatively be done intermittently (this is because stepping out does not occur frequently).

Also, in this invention, even if during initialization the target step number TSTEP changes, initialization is given priority and completed anyway. That is, once initialization commences, even if the target step number TSTEP changes, the initialization is not stopped part-way through and is executed to completion. In this case, when the target step number TSTEP changes immediately after the target step number TSTEP has become 'fully closed', the response to that change is delayed; however, in EGR control, if the EGRV 15 is fully closed it will not cause problems such as engine output reduction or deterioration in drivability, and it is better to increase the number of initializations and thereby prevent EGR control continuing with the stepping motor 15*a* stepped out.

Also, in this preferred embodiment, because at initialization the stepping motor 15*a* is driven through twice the maximum step number (for example 120 steps) in the valve-closing direction, even with 2-phase motor operation wherein due to slight stepping out the actual step number ESTEP and the rotation of the stepping motor 15*a* do not correspond it is possible to bring the valve body 57 to a fully closed state wherein it is firmly in abutment with the valve seat 59, and even if before initialization the actual step and the target step are different, full closure of the EGRV 15 is accomplished.

The number of steps through which the stepping motor 15*a* is driven in the valve-closing direction does not have to be twice the maximum step number, and may for example be made twice the present step number to shorten the time required for closure; all that is necessary is that the number of steps through which the motor is driven be somewhat greater than the present step number (i.e. be a number of steps such that the valve body 57 certainly abuts with the valve seat 59).

The rotor 54 is less likely to not rotate or to rotate in the valve-opening direction and rotates more stably when the 4-phase stepping motor 15*a* is driven as a 2-phase stepping motor than when it is 4-phase driven. Furthermore, because the first and third phases are driven and then the second and fourth phases are driven, even during a wire breakage full closure is possible and problems such as that the valve body 57 cannot be driven to the fully closed position during initialization do not arise.

In this preferred embodiment, the first and third phases are driven and then the second and fourth phases are driven, but of course this may be reversed and the first and third phases driven after the second and fourth phases are driven.

Figure 19:
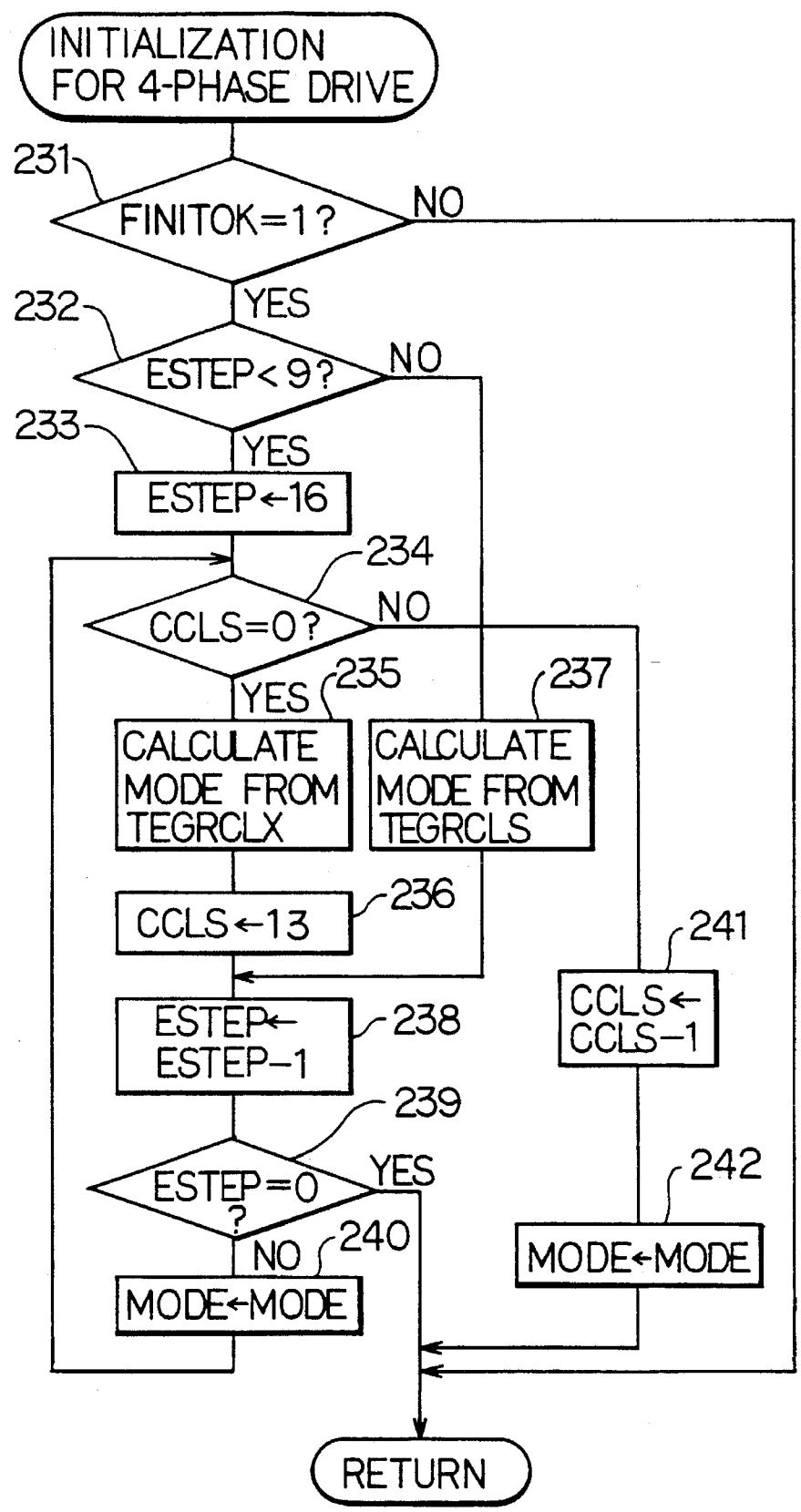
FIG. 19 is a flow chart showing the processing flow of initialization by 4-phase drive.

Also, in initialization during EGR control the 4-phase stepping motor 15*a* does not have to be 2-phase driven, and initialization may alternatively be effected by the 4-phase stepping motor 15*a* being 4-phase driven. The processing flow in a case where initialization is effected with 4-phase drive will now be described based on FIG. 19.

First, in step 231, processing determines whether or not an initialization execution conditions establishment flag FINITOK is "1", and when it is "0" ends the routine without executing the subsequent initialization processing therein. When on the other hand the initialization conditions establishment flag FINITOK is "1", processing determines whether or not the present step number (the actual opening degree) is lower than "9" (step 232), and when ESTEP<9 rewrites the present step number to "16" (step 233) and performs 16 steps of closing. This is in order to effect valve-closing through more steps than the actual step number to which the valve is open so as to certainly return the EGRV 15 to the reference position (fully closed) even if the stepping motor 15*a* has stepped out somewhat. After that, in step 234, processing determines whether or not the counter CCLS is "0", and when it is not "0" the counter CCLS is decremented by "1" (step 241).

When on the other hand the counter CCLS is "0", processing refers to the mode table of FIG. 7, calculates a new mode from the present mode and the table name 'TEGRCLX' in the table (step 235) and sets the value of the counter CCLS to "13" (step 236).

If it is determined in the above-mentioned step 232 that the present step number ESTEP is "9" or greater, processing calculates a new mode value MODE from the present mode and the table name 'TEGRCLS' in the table (step 237). After the processing of this step 237 or the above-mentioned step 236, in order to carry out closing, the present step number ESTEP is decremented by "1" (steps 238, 239) until it reaches "0". After that, the new mode value MODE is stored in place of the present mode value MODE (step 240), and the processing from step 234 onward is repeated. At this time, after the present step number ESTEP is decremented in step 238, it is determined whether or not this ESTEP is "0" (step 239), and when it is "0" the routine is ended.

As a result of the above processing, when the present step number ESTEP is less than "9", because based on the counter CCLS the present step number ESTEP decreases by "1" every 14 starts of this routine (4 ms processing), the movement speed of the valve body 57 of the EGRV 15 is 1 step of valve-opening every 56 ms (4 ms×14), ¹⁄₁₄ of that when the present step number ESTEP is "9" or greater. This is because when the valve body 57 of FIG. 2 abuts with the valve seat 59, if the valve body 57 is moving quickly there is a possibility of the stepping motor 15*a* stepping out, and also the valve body 57 itself is carrying out flow control, and if the valve body 57 is damaged by an impact it cannot carry out flow control accurately. When the motor drive circuit 47 reverses the direction of movement of the valve body 57, as shown in FIGS. 12A through 12D, FIGS. 13A through 13D and FIGS. 14A through 14D, a drive pulse is generated so that current flows through exciting coils 53 of the same phase for longer than normal. This is to effect reversal of the direction of movement with certainty and prevent stepping out of the stepping motor 15*a*.

In the preferred embodiment described above, based on the processing of step 161 in FIG. 16 the stepping motor 15*a* is initialized immediately after the IG switch 49 is turned from ON to OFF; however, alternatively the processing of step 161 may be omitted and initialization not carried out immediately after the IG switch 49 is turned OFF. In this case, a main relay control circuit for keeping the main power supply relay ON for a predetermined period after the IG switch 49 is turned OFF becomes unnecessary, and the circuit construction can be simplified.

This invention can be practiced with various other changes, such as integrating the motor drive circuit 47 with the microcomputer 21 or the EGRV 15, made within the technological scope of the invention.

As is clear from the above description, according to the invention, because when during EGR control the target opening degree of the exhaust gas control valve has become 'fully closed' the stepping motor is initialized by the exhaust gas recirculation valve being closed until the valve body thereof abuts with the valve seat, positional errors resulting from stepping out of the stepping motor or the like can be corrected by initialization of the stepping motor during EGR control, and it is possible to avoid a situation wherein EGR control is continued with positional errors uncorrected and consequently the output of the engine is reduced and the drivability of the vehicle is impaired.

Also, if the stepping motor is initialized and the exhaust gas recirculation valve is closed each time the target opening degree thereof becomes 'fully closed', positional error of the stepping motor is corrected more frequently and the precision of the EGR control can be further increased.

Furthermore, because when closing the exhaust gas recirculation valve to initialize the stepping motor the stepping motor is driven through a greater number of steps than the actual number of steps from the present position to the fully closed position of the exhaust gas recirculation valve, the valve body of the exhaust gas recirculation valve firmly abuts with the valve seat and the return of the valve body to its initial position (its fully closed position) is certain before the initialization processing is ended.

Also, if even when the target opening degree of the exhaust gas recirculation valve changes during initialization the initialization controlling means gives priority to the initialization, priority can be given to the correction of positional errors resulting from stepping out and the like.

The present invention should not be resticted to EGR control system but may be applied to other systems in which stepping motor is used.

What is claimed is:

1. An exhaust gas recirculation valve control apparatus comprising:

a stepping motor for driving an exhaust gas recirculation valve disposed midway in an exhaust gas recirculation passage for recirculating some of exhaust gases from an exhaust system of an internal combustion engine to an intake system thereof; and initialization control means for initializing the stepping motor in such a manner that, when a target opening degree of the exhaust gas recirculation valve becomes 'fully close' during an exhaust gas recirculation control operation, the exhaust gas recirculation valve is driven until a valve body of the valve abuts a valve seat thereof.

2. An exhaust gas recirculation valve control apparatus according to claim 1, wherein:

the initialization controlling means initializes the stepping motor every time when the target opening degree of the exhaust gas recirculation valve becomes 'fully closed', to thereby cause the valve body to abut the valve seat.

3. An exhaust gas recirculation valve control apparatus according to claim 1, wherein:

the initialization controlling means drives the stepping motor by a greater number of steps than an actual number of steps required for the exhaust gas recirculation valve to shift from its present position to its fully closed position, when the stepping motor is initialized.

4. An exhaust gas recirculation valve control apparatus according to claim 1, wherein:

the initialization controlling means continues to perform initialization of the stepping motor in preference to control of the exhaust gas recirculation valve even when the target opening degree of the exhaust gas recirculation valve changes during the initialization.

5. An exhaust gas recirculation valve control apparatus according to claim 1, wherein:

the stepping motor is a 4-phase drive type; and the initialization controlling means initializes the stepping motor by driving one of 1–3 phases and 2–4 phases first and the other of 1–3 phases and 2–4 phases thereafter.

6. An exhaust gas recirculation valve control apparatus according to claim 2, wherein:

the initialization control means drives the stepping motor by a greater number of steps than an actual number of steps required for the exhaust gas recirculation valve to shift form its present position to its fully closed position, when the exhaust gas recirculation valve is closed position, when the exhaust gas recirculation valve is closed for the initialization of the stepping motor by the initialization controlling means.

7. An exhaust gas recirculation valve control apparatus according to claim 2, wherein:

the initialization controlling means continues to perform initialization of the stepping motor in preference to control of the exhaust gas recirculation valve even when the target opening degree of the exhaust gas recirculation valve changes during the initialization.

8. An exhaust gas recirculation valve control apparatus according to claim 3, wherein:

the initialization control means continues to perform initialization of the stepping motor in preference to control of the exhaust gas recirculation control valve even when the target opening degree of the exhaust gas recirculation valve changes during the initialization.

9. A control apparatus comprising:

a fluid passage;

a valve having a valve body and a valve seat, and disposed in said fluid passage for controlling a fluid flow therethrough;

a stepping motor coupled with said valve body for driving said valve body; and initialization control means for initializing the stepping motor in such a manner that, when a target opening degree (TSTEP) of the valve becomes 'fully close' during a fluid flow control operation, the valve body is driven until the valve body abuts the valve seat.

* * * * *